(12) United States Patent
Casas

(10) Patent No.: US 8,754,558 B2
(45) Date of Patent: Jun. 17, 2014

(54) KINETIC ENERGY TO ELECTRIC POWER CONVERTER

(76) Inventor: Ramiro Casas, North Palm Beach, FL (US)

(*) Notice: Subject to any disclaimer, the term of this patent is extended or adjusted under 35 U.S.C. 154(b) by 435 days.

(21) Appl. No.: 13/252,775

(22) Filed: Oct. 4, 2011

(65) Prior Publication Data

US 2012/0086293 A1    Apr. 12, 2012

Related U.S. Application Data

(60) Provisional application No. 61/390,369, filed on Oct. 6, 2010.

(51) Int. Cl.
*H02K 7/10* (2006.01)
*H02K 7/06* (2006.01)
*H02K 21/12* (2006.01)
*H02K 23/60* (2006.01)
*F03B 13/12* (2006.01)

(52) U.S. Cl.
USPC .......... 310/80; 310/37; 310/156.16; 310/117; 290/53

(58) Field of Classification Search
CPC .................................. H02K 7/06; F03B 13/12
USPC .................... 310/37, 80, 156.16, 117; 290/53
See application file for complete search history.

(56) References Cited

U.S. PATENT DOCUMENTS

| | | |
|---|---|---|
| 381,160 A | 4/1888 | Moon |
| 707,230 A | 8/1902 | Henry |
| 1,149,998 A | 8/1915 | Inrig |
| 1,752,844 A | 4/1930 | Harrison |
| 1,884,932 A | 10/1932 | Walker |
| 2,004,224 A | 6/1935 | Silber |
| 2,944,603 A | 7/1960 | Baker et al. |
| 3,499,163 A | 3/1970 | Verreault |
| 3,559,027 A | 1/1971 | Arsem |
| 4,032,829 A | 6/1977 | Schenavar |
| 4,151,447 A | 4/1979 | von der Heide et al. |
| 4,278,928 A | 7/1981 | Griffiths et al. |
| 4,284,901 A | 8/1981 | Giguere |
| 4,318,018 A | 3/1982 | Kennedy |
| 4,381,041 A | 4/1983 | Butoi |
| 4,500,827 A | 2/1985 | Merritt et al. |
| 4,815,575 A | 3/1989 | Murty |
| 4,865,152 A | 9/1989 | Gardner, Jr. |
| 4,892,328 A | 1/1990 | Kurtzman et al. |
| 5,078,227 A | 1/1992 | Becker |
| 5,209,650 A * | 5/1993 | Lemieux ...................... 417/356 |
| 5,260,617 A | 11/1993 | Leibowitz |

(Continued)

*Primary Examiner* — Tran Nguyen
*Assistant Examiner* — Jose Gonzalez Quinones
(74) *Attorney, Agent, or Firm* — Allen D Hertz, PA; Allen D. Hertz

(57) ABSTRACT

A kinetic energy converter for converting linear motion into electrical energy has an outer body and an inner cylindrical body. The outer body and the inner body define a common central axis wherein the outer body is movable along the central axis with respect to the inner cylindrical body. A stator winding of a plurality of turns of at least one electrically conductive wire is disposed about an inner periphery of the inner body. A rotor having a central shaft and a plurality of magnets radially extending therefrom is rotatably disposed within the inner body and rotatable about the central axis. A helical blade extends from one end of the outer body to the rotor and is interengaged with the rotor wherein axial translation of the blade rotates the rotor about the central axis.

19 Claims, 3 Drawing Sheets

(56) References Cited

U.S. PATENT DOCUMENTS

| | | |
|---|---|---|
| 5,327,987 A | 7/1994 | Abdelmalek |
| 5,951,262 A * | 9/1999 | Hartman .................. 417/356 |
| 6,664,694 B2 | 12/2003 | Yang |
| 6,948,328 B2 | 9/2005 | Kidwell |
| 7,408,266 B2 | 8/2008 | Yeh |
| 2005/0064064 A1 * | 3/2005 | Ickinger .................. 425/574 |
| 2006/0125325 A1 | 6/2006 | Beaulieu |
| 2007/0175716 A1 | 8/2007 | Kim et al. |
| 2010/0001529 A1 * | 1/2010 | Rosefsky .................. 290/52 |

* cited by examiner

KINETIC ENERGY TO ELECTRIC POWER CONVERTER

CROSS-REFERENCE TO RELATED APPLICATION

This Non-Provisional Utility application claims the benefit of U.S. Provisional Patent Application Ser. No. 61/390,369, filed on Oct. 6, 2010, which is incorporated herein in its entirety.

FIELD OF THE INVENTION

The present disclosure generally relates to apparatuses and methods for capturing and storing kinetic energy. More particularly, the present disclosure relates to a kinetic energy converter that translates linear motion into electrical energy.

BACKGROUND OF THE INVENTION

With a growing awareness that dependency upon carbon based fuels is a worldwide factor in ecological, political, and economic instability, increasing numbers of consumers are turning their attention to alternative fuel automobile and electric vehicle technologies with additional attention being directed to reducing such dependencies with respect to other energy consuming activities in everyday life. The automotive markets are showing a shift away from fossil fuel technologies and in response to this market demand. As the consumer demand increases in a free market economy, the product supply will grow and evolve to meet the demand for green technologies.

While some green technologies completely eliminate the use of fossil fuels for propulsive power, such as totally electric cars, other technologies attempt to improve the energy efficiency of fossil fueled vehicles through the use of hybrid and other technologies. The burning of fossil fuels in vehicles such as in internal combustion engines has long been recognized as being relatively inefficient with a significant portion of the energy released during combustion being wasted. One method of improving energy efficiency is utilizing fossil fuel to generate electricity for powering a vehicles drive trail. In this manner, the energy of the fossil fuel can be generated at an optimum level, translated to electrical energy for storage in batteries, wherein the cyclical demands of driving are drawn from the batteries rather than cycling an internal combustion engine between efficient and inefficient modes of operation.

In other areas of everyday life, one witnesses natural motions that if harnessed can contribute to the energy demands of society. Air mass movements such as the wind can be transformed to mechanical motions to drive machines, the rising and falling of the tides or cyclical wave movement are other forms of motion with the potential to be harnessed to capture the kinetic energy expended during the movements of those phenomena. Even the cyclical movement generated by a person while breathing offers the potential for capture and transformation for use in powering implanted life sustaining medical devices.

Therefore, a technology is needed whereby everyday motion, such as linear motion or rotational motion, can be captured, harnessed, and transformed into a storable form of energy such as electrical power for later use.

SUMMARY OF THE INVENTION

The present disclosure is generally directed to a kinetic energy converter for converting linear motion into electrical energy. The kinetic energy converter has an outer body and an inner cylindrical body that define a common central axis wherein the outer body is movable along the central axis with respect to the inner cylindrical body. A stator winding of a plurality of turns of at least one electrically conductive wire is disposed about an inner periphery of the inner body. A rotor having a central shaft and a plurality of magnets radially extending therefrom is rotatably disposed within the inner body and rotatable about the central axis. A helical blade extends from one end of the outer body to the rotor and is interengaged with the rotor wherein axial translation of the blade rotates the rotor about the central axis.

In some embodiments, the kinetic energy converter may include Compression springs interposed between the inner body and outer body to bias the inner and outer bodies away one from the other.

In another aspect, the kinetic energy converter can include a rotor shaft comprised of inner and outer cylinders wherein the cylinders define a cannular void between the cylinders, which can be filled with a thermally absorptive liquid.

In still another aspect, the rotor shaft includes radially extending pins on which the magnets are movably mounted to be radially translatable. The magnets can also be biased toward the rotor shaft with one or more tension springs having one end affixed to the magnet and an opposite end affixed to the rotor shaft.

In yet another aspect, the helical blade axially extends into a central void in the rotor shaft wherein one or more clutches interengage the helical blade with the shaft such that axial translation of the helical blade in a first direction engages the clutches with the rotor shaft and axial translation of the helical blade in an opposite direction disengages the clutches from the rotor shaft.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
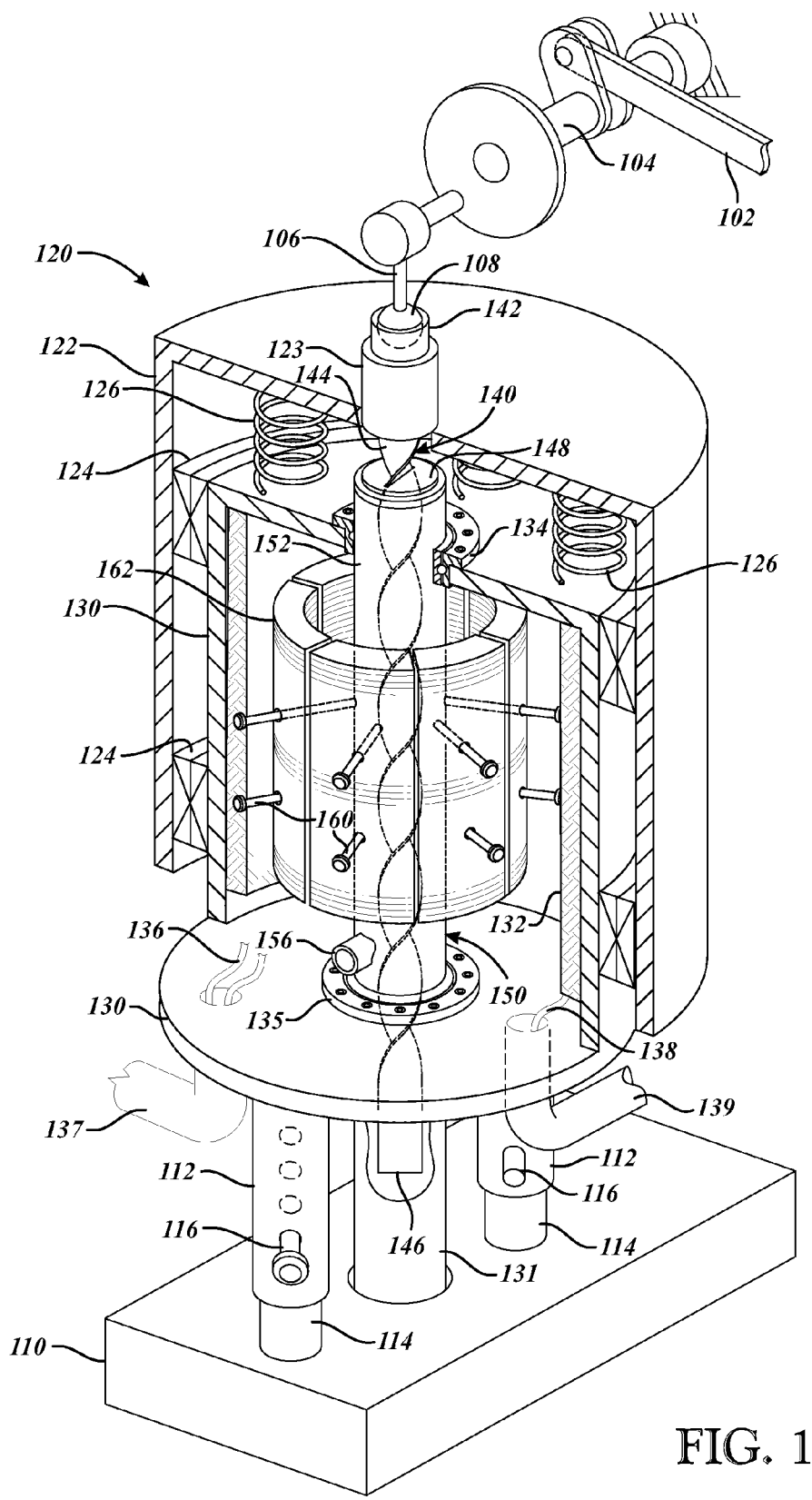
FIG. 1 presents a perspective cut away kinetic energy converter according to the present invention.
Figure 2:
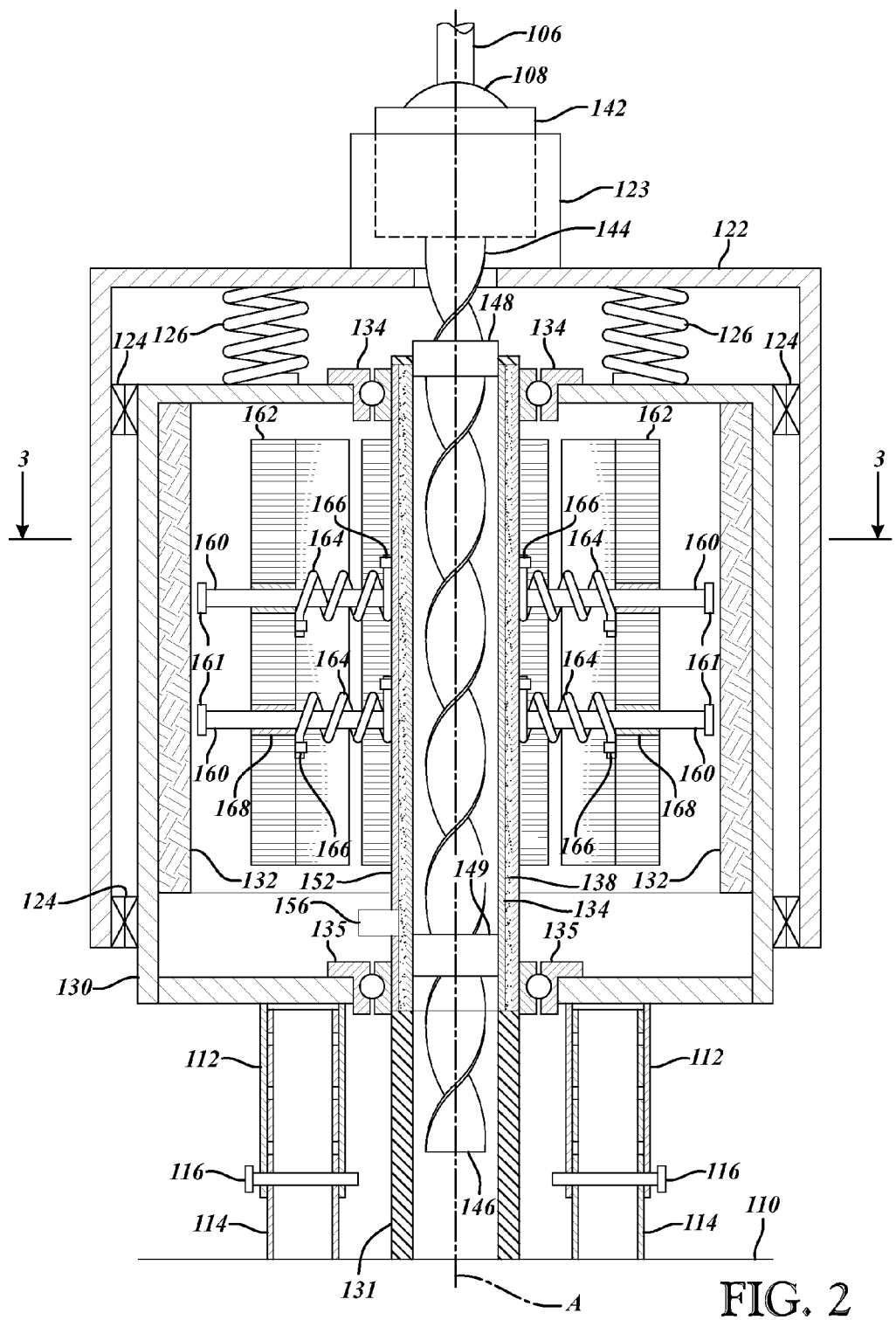
FIG. 2 presents an elevation cross-section of the kinetic energy converter of FIG. 1.
Figure 3:
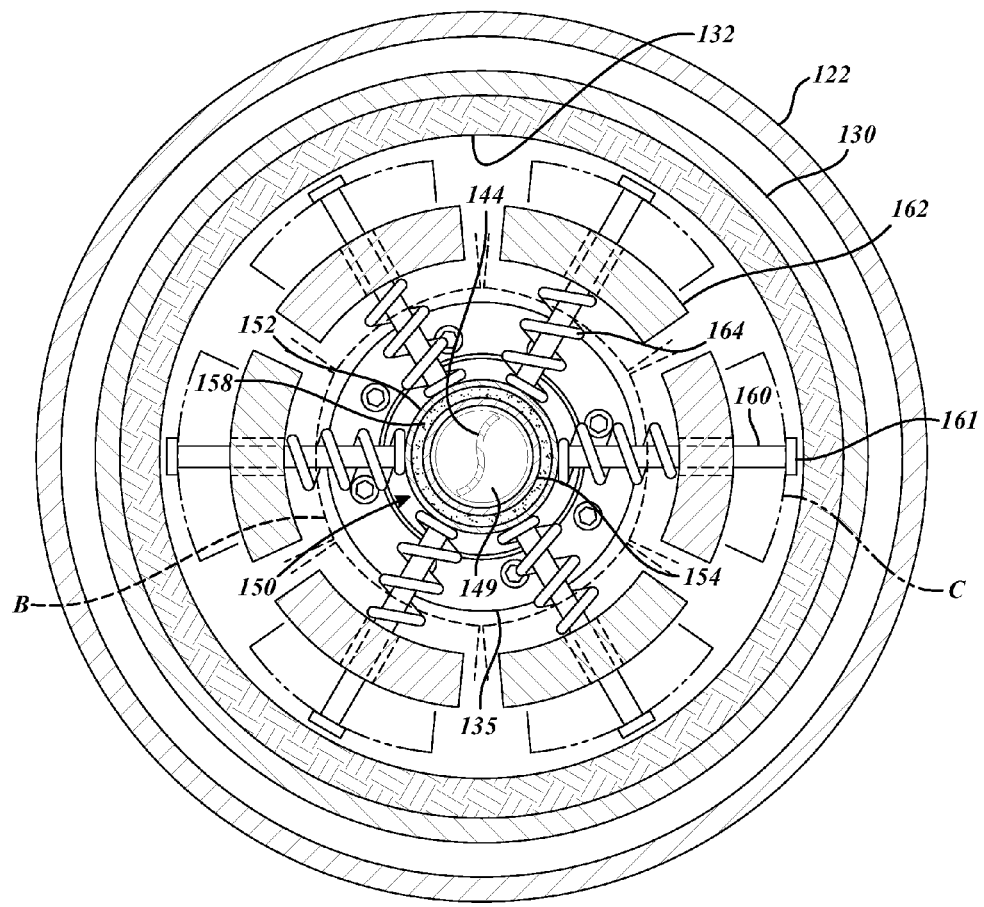
FIG. 3 presents a cross-sectional plan view of the kinetic energy converter shown in FIG. 2 and taken along the line 3-3, FIG. 2.

Turning to the drawings, FIGS. 1-3 show a kinetic energy converter 120 for converting linear motion kinetic energy into electrical energy and which is one of the preferred embodiments of the present invention and illustrates its various components. Kinetic energy converter includes an outer body 122 and an inner body 130 at least partially encased within outer body 122 and both define a common central axis "A" (FIG. 2). Inner body 130 has outer support tubes 112 extending from a bottom thereof. As illustrated, a base 110 has inner support tubes 114 extending upwardly therefrom and receives thereover outer support tubes 112. Inner support tubes 114 have a plurality of holes therethrough such that pins 116 are insertable therein to adjust the height of kinetic energy converter 120 with respect to base 110 in a manner well known in the art.

Kinetic energy converter 120 functions as an electric generator or alternator for translating linear motion into the rotating motion of a rotor to repeatedly pass magnets proximate to a stator thereby creating electrical energy. Inner body 130 is cylindrical in shape and has disposed about an inner periphery a stator winding 132. Stator winding 132 is comprised of one or more electrically conductive wires arranged in multiple turns about the inner periphery of inner body 130 in a manner well known in the art. The stator winding 132 is electrically connected to power out conductors 136 routed in conduit 137. Stator winding 132 is also electrically connected to exciter conductor 138 in conduit 139 for the generation of alternating current, the functionality thereof being well known in the art and not the subject of further discussion herein.

Inner body 130 includes a rotor assembly 150, which is rotatingly journaled at both ends thereto with upper bearing 134 and lower bearing 135. Rotor assembly 150 also rotates about central axis "A". Rotor assembly includes a shaft, which, as illustrated, is comprised of an outer cylinder 152 and an inner cylinder 154 in fixed relationship one with the other to rotate as a singular shaft. Cylinders 152 and 154 define a cannular void therebetween, which is filled with a thermally absorptive liquid 158. Outer cylinder 152 includes a fill port 156 for introducing thermally absorptive liquid 158 between cylinders 152 and 154.

Outer cylinder 152 has a plurality of guide pins 160 extending radially outward therefrom in a spoke-like fashion at equal radial intervals. For example, if there are six guide pins 160 extending about the periphery of outer tube 152, adjacent pins 160 form a sixty degree angle. One set of pins 160 is positioned proximate to a top end of rotor 150 and a second set of pins 160 is positioned proximate to a bottom end of rotor 150. Each upper pin 160 has a lower pin 160 in vertical registration therewith. Each pair of vertically registered pins 160 has mounted thereon a magnet 162 and can include a bushing 168 between magnet 162 and the shaft of pins 160. Magnet 162 is slidable between a retracted position "B" (FIG. 3) and an extended position "C" (FIG. 3) along pins 160.

Extended position "C" is defined by head 161 of each pin 160 to limit the radial travel of magnet 162. Each magnet 162 has associated therewith at least one tension spring 164 interposed between magnet 162 and outer cylinder 152. As illustrated, a tension spring 164 is sleeved over each shaft of pin 160 and in this manner pin 160 also maintains springs 164 in a desired linear alignment. One end of each spring 164 is affixed to magnet 164 and one end affixed to outer cylinder 152 with fasteners 166 so that at rest, springs 164 bias magnets 162 close to axis "A". It is understood that any biasing member suitable for the subject application can provide the function of the tension spring 164.

Outer body 122 at least partially encloses inner body 130, and as shown, outer body 122 is also cylindrical in shape with housing guides 124 disposed between an inner periphery of outer body 122 and the outer periphery of inner body 130. Housing guides facilitate the axial movement of outer body 122 with respect to inner body 130. A plurality of compression springs 126 are disposed between an upper end of inner body 130 and an upper end of outer body 122 and function to bias the upper end of outer body 122 away from the upper end of inner body 130.

Outer body 122 also includes at a center of its upper end a receptacle for closely receiving a socket 142 in a manner to securely maintain socket 142 in receptacle 123. A twisted blade assembly 140, comprising a helically twisted blade 144, extends downwardly from the top center of outer body 122 into the central cavity of inner tube 154 of rotor assembly 150. Inner tube 154 also closely receives an upper clutch 148 and a lower clutch 149 in its central cavity. Clutches 148 and 149 also have a central aperture conforming to the cross-section of helical blade 144. Helical blade 144 passes through clutches 148 and 149. Clutches 148 and 149 are unidirectional drivers in that rotation of clutches in one direction will rotationally engage rotor assembly 150 and rotation in an opposite direction will disengage clutches 148 and 149 from rotor assembly 150 and 'free wheel' with respect to rotor assembly 150. Such clutch configurations are known in the art and thus require no further discussion. It is understood by those skilled in the art that any mechanical interface, which translates a linear motion into a rotation motion, can be utilized in place of the helically twisted blade 144 and clutch 148, 149 mechanism. Examples include a double-helically twisted assembly, a screw drive, and the like.

The length of helical blade 144 is such that a distal end 146 extends below the bottom of inner body 130. Hence, the bottom of inner body 130 also includes at a center thereof, a blade sleeve 131 into which the distal end 146 extends and in which distal end is free to axially translate during operation.

Socket 142 at the top of outer body 122 movably receives ball 108 to which vertical shaft 106 is attached. Vertical shaft 106, in turn is affixed to crank shaft 104, which is rotated by the linear translation of connecting rod 102. Those practiced in the art will recognize that other motion direction translation mechanisms can be used to translate horizontal motion of connecting rod 102 into the vertical motion of vertical shaft 106 and the mechanism as shown is merely illustrative and not intended to be limiting. Further, kinetic energy converter 120 can be oriented in a manner that the linear motion of connecting rod 102 acts along central axis 102.

In operation, a member of a larger apparatus causes connecting rod 102 to linearly translate or causes crankshaft 104 to rotate. The rotation of crankshaft 104 in turn causes vertical shaft 106 and ball 108 to cyclically translate in an up and down motion. During the upward translation of vertical shaft 106 the upper end of outer body 122 translates along axis "A" and since lower body 130 is fixed to base 110, lower body 130 remains stationary with respect to upper body 122. In concert with the upward translation of upper body 122, helical blade 144 is drawn upwardly through clutches 148 and 149. The conforming slots in clutches 148 and 149 follow the helical twist of blade 144 in a manner that clutches 148 and 149 rotate in their "free-wheeling" state. The upward movement of outer body 122 is aided by the expansion of compression springs 126.

As vertical rod 106 passes top dead center of crankshaft 104, rod 106 begins a downward stroke. Outer body 122 is forced downward compressing springs 126 and is smoothly guided along the outer periphery of inner body 130 by housing guides 124. Concurrent with the downward movement of outer body 122, helical blade is also translated downwardly along axis "A". The conforming slots in clutches 148 and 149 again follow the helical twist of blade 144 and rotate in an opposite "engagement" state. In this state, the rotation of clutches 148 and 149 is transferred to the shaft of rotor assembly 150, here illustrated as combined cylinders 152, 154. Rotor assembly 150 at rest has magnets 162 at their closest positions, positions "B" (FIG. 3), and thus in its state of least inertia. In this state, rotor assembly 150 is at its easiest to rotate about central axis "A".

Each cycle of up and down strokes of helical blade 144 results in clutches 148 and 149 to cycle through their "free-wheeling" and "engagement" states. Each downward stroke of blade 144 imparting more and more energy to the rotation of rotor assembly 150. As the rotational speed of rotor assembly 150 increases, the centrifugal force acting upon magnets 162 increases to overcome the biasing force of tension springs 162 until magnets 162 have traveled the full length of pins 160 to their most distal positions, positions "C" (FIG. 3). As rotor assembly 150 continues to rotate about axis "A", the magnetic field of magnets 162 pass through the windings of stator winding 132, thus inducing a direct or alternating electrical current that is directed to conductors 136 for storage in a battery or for use in powering a remotely located electrical apparatus.

Upon the cessation of the force driving connecting rod 102 or crankshaft 104, the cyclical up and down translation of outer body 122 and helical blade 144 also ceases. With the cessation of the axial translation of helical blade 144, clutches 148 and 149 enter their "free-wheeling" states. With no driving force applied thereto through clutches 148 and 149, the rotational speed of rotor assembly 150 gradually lessens. As the rotation of rotor assembly decreases, so does the centrifugal forces acting upon magnets 162 until the biasing force of springs 164 exceeds the centrifugal forces. Springs 164 then begin to bias magnets 162 from their extended positions "C" to their respective retracted positions "B" until such time as kinetic energy converter 120 is again actively engaged.

Those practiced in the art will recognize that kinetic energy converter 120 can be scaled to fit large or small applications including but not limited to automotive and other vehicular applications, residential wind and water turbine applications, physiological and bio-dependent medical applications, recreational applications, and aviation applications.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A kinetic energy converter for converting linear motion into electrical energy, said kinetic energy converter comprising:
    an outer body;
    an inner cylindrical body, said outer body and said inner body defining a common central axis wherein said outer body is movable along said central axis with respect to said inner cylindrical body;
    a stator winding of a plurality of turns of at least one electrically conductive wire disposed about an inner periphery of said inner body;
    a rotor having a central shaft and a plurality of magnets radially extending therefrom, said rotor rotatably disposed within said inner body and rotatable about said central axis; and
    a helical blade extending from said outer body to said rotor and interengaged therewith wherein axial translation of said blade rotates said rotor about said central axis.

2. A kinetic energy converter as recited in claim 1, further comprising a series of pins, said pins extending radially from said outer cylindrical body,
    wherein each of said magnets slideably arranged upon at least one pin of said series of pins.

3. A kinetic energy converter as recited in claim 2, further comprising a series of biasing members, said biasing members retain said magnets in a retracted position, wherein said magnets are positioned proximate said outer cylinder until a centrifugal force acting upon said magnets increases to overcome a biasing force provided by said biasing members, said centrifugal force resulting from a rotational speed of said rotor.

4. A kinetic energy converter as recited in claim 2, further comprising a head located at a distal end of each pin, wherein said head limits an outward radial motion of each respective magnet.

5. A kinetic energy converter as recited in claim 4, further comprising a series of biasing members, said biasing members retain said magnets in a retracted position, wherein said magnets are positioned proximate said outer cylinder until a centrifugal force acting upon said magnets increases to overcome a biasing force provided by said biasing members wherein said magnets are thrust to an extended position, said extended positioned being limited by said head, said centrifugal force resulting from a rotational speed of said rotor.

6. A kinetic energy converter as recited in claim 1, further comprising a series of compression springs provided between said outer body and said inner cylindrical body.

7. A kinetic energy converter as recited in claim 1, further comprising a motion direction translation mechanism, wherein said motion direction translation mechanism translates a horizontal motion into a vertical motion of said outer body.

8. A kinetic energy converter for converting linear motion into electrical energy, said kinetic energy converter comprising:
    an outer cylindrical body;
    an inner cylindrical body, said outer body and said inner body defining a common central axis wherein said outer body is slidably movable along said central axis with respect to said inner cylindrical body wherein said outer cylindrical body and said inner cylindrical body remain in rotational alignment;
    a stator winding of a plurality of turns of at least one electrically conductive wire disposed about an inner periphery of said inner body;

a rotor having a central shaft and a plurality of magnets radially extending therefrom, said rotor rotatably disposed within said inner body and rotatable about said central axis; and a helical blade extending from said outer body to said rotor and interengaged therewith wherein axial translation of said blade rotates said rotor about said central axis.

9. A kinetic energy converter as recited in claim 8, further comprising a series of pins, said pins extending radially from said outer cylindrical body, wherein each of said magnets slideably arranged upon at least one pin of said series of pins.

10. A kinetic energy converter as recited in claim 9, further comprising a series of biasing members, said biasing members retain said magnets in a retracted position, wherein said magnets are positioned proximate said outer cylinder until a centrifugal force acting upon said magnets increases to overcome a biasing force provided by said biasing members, said centrifugal force resulting from a rotational speed of said rotor.

11. A kinetic energy converter as recited in claim 9, further comprising a head located at a distal end of each pin, wherein said head limits an outward radial motion of each respective magnet.

12. A kinetic energy converter as recited in claim 11, further comprising a series of biasing members, said biasing members retain said magnets in a retracted position, wherein said magnets are positioned proximate said outer cylinder until a centrifugal force acting upon said magnets increases to overcome a biasing force provided by said biasing members wherein said magnets are thrust to an extended position, said extended positioned being limited by said head, said centrifugal force resulting from a rotational speed of said rotor.

13. A kinetic energy converter as recited in claim 8, further comprising at least one body biasing member positioned between said outer cylindrical body and said inner cylindrical body, said at least one body biasing member applies a separation force between said outer cylindrical body and said inner cylindrical body.

14. A kinetic energy converter as recited in claim 8, further comprising a motion direction translation mechanism, wherein said motion direction translation mechanism translates a horizontal motion into a vertical motion of said outer body.

15. A kinetic energy converter for converting linear motion into electrical energy, said kinetic energy converter comprising:

an outer cylindrical body;

an inner cylindrical body, said outer body and said inner body defining a common central axis wherein said outer body is slidably movable along said central axis with respect to said inner cylindrical body wherein said outer cylindrical body and said inner cylindrical body remain in rotational alignment;

at least one body biasing member positioned between said outer cylindrical body and said inner cylindrical body, said at least one body biasing member applies a separation force between said outer cylindrical body and said inner cylindrical body;

a stator winding of a plurality of turns of at least one electrically conductive wire disposed about an inner periphery of said inner body;

a rotor having a central shaft and a plurality of magnets radially extending therefrom, said rotor rotatably disposed within said inner body and rotatable about said central axis;

a helical blade extending from said outer body to said rotor and interengaged therewith wherein axial translation of said blade rotates said rotor about said central axis; and a series of pins, said pins extending radially from said outer cylindrical body, wherein each of said magnets slideably arranged upon at least one pin of said series of pins.

16. A kinetic energy converter as recited in claim 15, further comprising a series of biasing members, said biasing members retain said magnets in a retracted position, wherein said magnets are positioned proximate said outer cylinder until a centrifugal force acting upon said magnets increases to overcome a biasing force provided by said biasing members, said centrifugal force resulting from a rotational speed of said rotor.

17. A kinetic energy converter as recited in claim 15, further comprising a head located at a distal end of each pin, wherein said head limits an outward radial motion of each respective magnet.

18. A kinetic energy converter as recited in claim 17, further comprising a series of biasing members, said biasing members retain said magnets in a retracted position, wherein said magnets are positioned proximate said outer cylinder until a centrifugal force acting upon said magnets increases to overcome a biasing force provided by said biasing members wherein said magnets are thrust to an extended position, said extended positioned being limited by said head, said centrifugal force resulting from a rotational speed of said rotor.

19. A kinetic energy converter as recited in claim 15, further comprising a motion direction translation mechanism, wherein said motion direction translation mechanism translates a horizontal motion into a vertical motion of said outer body.

* * * * *